United States Patent [19]

Bamberger et al.

[11] 3,929,979

[45] Dec. 30, 1975

[54] PROCESS FOR GENERATING HYDROGEN

[75] Inventors: Carlos E. Bamberger; Donald M. Richardson; Warren R. Grimes, all of Oak Ridge, Tenn.

[73] Assignee: The United States of America as represented by the United States Energy Research and Development Administration, Washington, D.C.

[22] Filed: Sept. 10, 1974

[21] Appl. No.: 504,790

[52] U.S. Cl. ............... 423/648; 423/580; 423/594; 423/632
[51] Int. Cl.². . C01B 1/03; C01G 49/00; C01B 5/00
[58] Field of Search ............ 423/648, 632, 594, 580

[56] References Cited
UNITED STATES PATENTS
2,835,553  5/1958  Harrison et al. ................... 423/594

FOREIGN PATENTS OR APPLICATIONS
722,175  1/1955  United Kingdom ................. 423/632
44-14539  9/1969  Japan ............................... 423/632

OTHER PUBLICATIONS
J. W. Mellor's "A Comp. Treatise on Inorg. & Theo. Chem.," Vol. 13, 1934 Ed., p. 762, Longmans, Green & Co., N.Y.

*Primary Examiner*—Edward Stern
*Attorney, Agent, or Firm*—Dean E. Carlson; David S. Zachry; John B. Hardaway

[57] ABSTRACT

Magnetic iron oxide is reacted with an alkali metal hydroxide to produce hydrogen as a product. Alkali metal ferrite is also produced as a product and is subjected to reaction with water to produce ferric oxide and the alkali metal hydroxide used in the first reaction. The ferric oxide is decomposed by heat such that magnetic iron oxide and oxygen are products of the decomposition. By carrying out the reactions in the appropriate order, a closed thermochemical process for splitting water into hydrogen and oxygen is provided.

6 Claims, 1 Drawing Figure

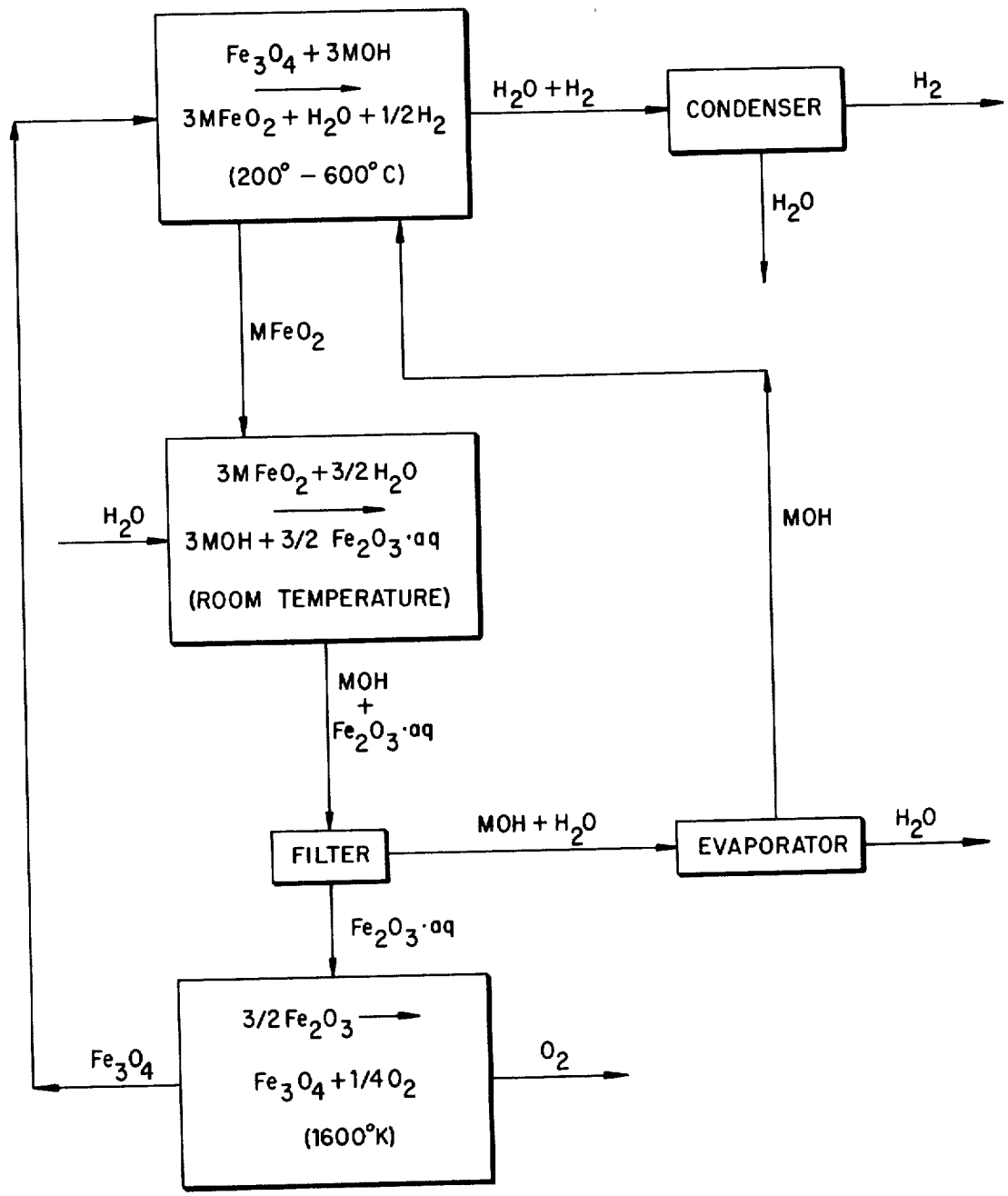

PROCESS FOR GENERATING HYDROGEN

BACKGROUND OF THE INVENTION

This invention was made in the course of, or under, a contract with the United States Atomic Energy Commission. It relates generally to the art of thermochemical hydrogen production.

Hydrogen is presently considered to be an attractive energy source for further applications. Hydrogen has many attributes which make it a logical replacement for fossil fuels which are being rapidly consumed. The combustion of hydrogen produces no obnoxious products and thus no insult to the evironment. Existing energy transport means and consuming equipment can be adapted with present technology for a hydrogen-based energy system. Natural gas pipelines, for example, can be converted to hydrogen carrying pipelines with minor modifications. Experimental automobiles are presently operating with modified conventional internal combustion engines using hydrogen as a fuel.

With prospects for hydrogen utilization becoming evident, means for producing hydrogen need to be upgraded and increased. Conventionally, hydrogen has been produced by the electrolysis of water. Electrolysis, however, is highly inefficient when considering the inefficiencies present in electricity production coupled with an efficiency of about 80 percent for electrolysis itself. Inherent in the use of electrolysis to produce hydrogen is the general futility of using one energy source, typically fossil fuels at present, at the point of electricity production to ultimately produce hydrogen at the point of electrolysis. The disadvantages and excess consumption of fossil fuels are obviously not overcome by such a process. Chemical processes for the direct conversion of fossil fuels and water into a hydrogen product are presently at the point of technical feasibility. This overcomes many of the inefficiencies and disadvantages of electrolysis. However, prudence indicates that fossil fuels should be preserved to the extent possible for long term pharmaceutical, chemical, and metallurgical uses.

Thermochemical processes present the most attractive means for producing hydrogen. Via this technique water is broken down into hydrogen and oxygen through a series of chemical reactions not involving the use of fossil fuels.

This series of reactions is desirably carried out in a closed cyclic manner such that all products except water, hydrogen, and oxygen are reused as reactants in the other reactions. One such process is disclosed in U.S. Pat. No. 3,490,871, which utilizes the reaction of cesium with water to release hydrogen. Another such process is disclosed in commonly assigned copending application Ser. No. 487,323 of July 10, 1974, which involves the reaction of copper and magnesium chlorides with water to produce hydrogen in a closed cyclic manner.

One of the objects of the thermochemical processes is the direct utilization of heat from an energy producing facility such as a nuclear reactor or solar sources. The upper temperature limit of such source is presently about 1300°K for a high-temperature, gas-cooled reactor and 3500°K for a solar furnace.

SUMMARY OF THE INVENTION

It is thus an object of the present invention to provide a novel hydrogen producing reaction.

It is a further object of this invention to combine the hydrogen producing reaction with a series of other reactions to provide a closed thermochemical process for splitting water into hydrogen and oxygen.

These as well as other objects are accomplished by reacting magnetic iron oxide with an alkali metal hydroxide to produce hydrogen, water, and an alkali metal ferrite as products. In a closed cyclic mode of operation the alkali metal ferrite is reacted with excess water to form insoluble ferric oxide and the alkali metal hydroxide which can be reused in the hydrogen producing reaction. The ferric oxide is partially decomposed by heat to provide the magnetic iron oxide for use in the hydrogen producing reaction and oxygen. In another embodiment, the hydrogen producing reaction is combined with a series of prior art reactions to provide two hydrogen producing reactions within a closed cycle.

BRIEF DESCRIPTION OF THE DRAWING

The single FIGURE of drawing is a schematic flow chart of one of the closed cycle embodiments of the invention.

DETAILED DESCRIPTION

According to this invention, it has been found that magnetic iron oxide can be reacted with molten alkali hydroxide to produce hydrogen gas as a product thereof. The reaction proceeds as follows:

(1) $Fe_3O_4 + 3 MOH \rightarrow 3 MFeO_2 + H_2O + \frac{1}{2} H_2$ 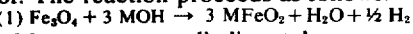

where M represent an alkali metal.

Essentially all alkali metals have been found to be substantial equivalents within the above reaction. However, sodium is preferred because of its lower cost. Potassium, however, requires a lower temperature of reaction and thus lower heat costs. Potassium may therefore be considered as an alternate to sodium. The remaining alkali metals are operable in the reaction, but for obvious reasons are impractical. The reaction is preferably carried out using about 100 percent excess MOH over the stoichiometric proportions of the reaction. Using proportions as above, the various reactions go to substantial completion within less than four hours at the upper temperature of the preferred ranges. Sodium hydroxide reacts with magnetic iron significantly within the temmperature range 280° to 600°C. Potassium hydroxide reacts significantly within the temperature range of 200° to 500°C, and lithium hydroxide within the range of 780° to 880°C.

Due to the highly corrosive nature of the alkali metal hydroxides, the selection of an appropriate container is an important aspect of carrying out the hydrogen producing reaction. Alumina is suitable for use with NaOH and KOH, but now for LiOH. Copper, however, is compatible with all three metal hydroxides up to about 600°C.

The reaction is preferably carried out in a sealed container such as a retort with gas extraction means so that the gaseous atmosphere containing hydrogen may be continuously extracted.

As is depicted in the FIGURE of drawing, the gaseous atmosphere which contains both hydrogen and water vapor is subjected to a separation process so as to recover and collect the hydrogen product. This is preferably done by cooling the extracted atmosphere to condense and trap the water vapor. Optionally, a desiccant such as anhydrous calcium sulfate may be used for this purpose.

According to this invention the novel hydrogen producing reaction may be combined with other reactions to produce a closed thermochemical process for producing hydrogen and oxygen. In this embodiment of the invention, the following three reactions are carried out in conjunction with one another.

(1) $Fe_3O_4 + 3 MOH \rightarrow 3MFeO_2 + H_2O + \frac{1}{2} H_2$
(2) $3 MFeO_2 + 3/2 H_2O \rightarrow 3 MOH + 3/2 Fe_2O_3 \cdot aq$
(3) $3/2 Fe_2O_3 \xrightarrow{\Delta} Fe_3O_4 + \frac{1}{4} O_2$ A flow chart of this aspect of the invention is illustrated in the single FIGURE of drawing. Since the reactions involved go to substantial completion and in order to minimize separation problems, this embodiment is preferably carried out in a batch-wise manner. Reaction 1 is carried out substantially as described above. Reaction (2) is carried out at room temperature by simply placing the residue from reaction (1) in water. Any remaining MOH or $Fe_3O_4$ which may be in the residue from reaction (1) will not adversely affect reactions (2) or (3). While room temperature is stated as being preferred, the reaction may be carried out at temperature up to about 200°C. The proportion of water to residue in reaction (2) is not particularly important. However, from an economic point of view, it should be as low as possible while meeting the requirements of stoichiometry. If greater than the stoichiometric amount of water is used, the higher grade heat of the evaporator will be wasted in removing the excess water to recover the MOH.

The MOH produced in this reaction goes into solution while hydrated ferric oxide is precipitated. The ferric oxide precipitate is simply recovered by filtration. The filtrate can be subjected to evaporation in a conventional manner to recover the MOH for reuse in reaction (1). The hydrated ferric oxide decomposes at a temperature of about 1600°K. This particular step of the process is carried out a temperature above that encountered in any present reactor design. Presently auxiliary heat would thus have to be provided in order to couple this reaction to the heat of a nuclear reactor.

Reaction (3) is preferably carried out in an alumina or zirconia reaction vessel with means for continuously extracting the gaseous atmosphere and recovering the oxygen by-product. The preferred temperature for carrying out this reaction is about 1600°K to minimize problems associated with higher temperatures. However, at 1735°K the equilibrium oxygen partial pressure of oxygen is about one atmosphere so that the reaction goes to substantial completion almost instantaneously when the gaseous atmosphere is continuously extracted. The magnetic iron oxide product is then used again as a reactant in reaction (1). At this point one cycle of the process is completed and water has been broken down into hydrogen and oxygen.

Alternatively, the hydrogen producing reaction of this invention may be carried out in conjunction with the process described in EUR 4958 f (1973) Hardy-Grena, C., *Thermal Decomposition of Water in Chemical Cycles of the Fe-Cl₂ Family*. Such a process then comprises three thermochemical cycles, all of which effectively split water into hydrogen and oxygen via the combination of reactions (1) and (2) of this invention with the reactions disclosed therein. Two hydrogen producing reactions are thus provided within each cycle.

The first of such cycles is:

(1) $2 Fe_3O_4 + 6 MOH \rightarrow 6 MFeO_2 + 2 H_2O + H_2$ (500°C)
(2) $6 MFeO_2 + 3 H_2O \rightarrow 6 MOH + 3 Fe_2O_3 \cdot aq$ (r.t.)

-continued
(5) $3 Fe_2O_3 + 18 HCl \rightarrow 6 FeCl_3 + 9 H_2O$ (120°C)
(6) $6 FeCl_3 \rightarrow 6 FeCl_2 + 3 Cl_2$ (420°C)
(7) $6 FeCl_2 + 8 H_2O \rightarrow 2 Fe_3O_4 + 12 HCl + 2 H_2$ (650°C)
(8) $3 H_2O + 3 Cl_2 \rightarrow 6 HCl + 3/2 O_2$ (800°C)

The second cycle is:

(1) $2 Fe_3O_4 + 6 MOH \rightarrow 6 MFeO_2 + 2 H_2O + H_2$ (500°C)
(2) $6 MFeO_2 + 3 H_2O \rightarrow 6 MOH + 3 Fe_2O_3 \cdot aq$ (r.t.)
(9) $3 Fe_2O_3 + 9 Cl_2 \rightarrow 6 FeCl_3 + 9/2 O_2$ (1000°C)
(6) $6 FeCl_3 \rightarrow 6 FeCl_2 + 3 Cl_2$ (420°C)
(10) $12 HCl + 3 O_2 \rightarrow 6 Cl_2 + 6 H_2O$ (400°C)
(7) $6 FeCl_2 + 8 H_2O \rightarrow 2 Fe_3O_4 + 12 HCl + 2 H_2$ (650°C)

The third of such cycle is:

(1) $2 Fe_3O_4 + 6 MOH \rightarrow 6 MFeO_2 + 2 H_2O + H_2$ (500°C)
(2) $6 MFeO_2 + 3 H_2O \rightarrow 6 MOH + 3 Fe_2O_3 \cdot aq$ (r.t.)
(9) $Fe_2O_3 + 3 Cl_2 \rightarrow 2 FeCl_3 + 3/2 O_2$ (1000°C)
(5) $2 Fe_2O_3 + 12 HCl \rightarrow 4 FeCl_3 + 6 H_2O$ (120°C)
(6) $6 FeCl_3 \rightarrow 6 FeCl_2 + 3 Cl_2$ (420°C)
(7) $6 FeCl_2 + 8 H_2O \rightarrow 2 Fe_3O_4 + 12 HCl + 2 H_2$ (650°C)

By utilizing any of the above cycles, the hydrogen production per cycle is tripled over that of the cycle illustrated in the drawing.

Having generally described the reaction processes of this invention, the following specific examples are given as a further illustration thereof:

EXAMPLE I

Magnetic iron oxide (4.54 g), was reacted with an excess of lithium hydroxide (7.21 g), at continuously increasing temperature in a copper crucible, located in a quartz tube. The quartz tube system was provided with a thermocouple well and gas lines for sparging with argon. The exiting gas mixture was dried by passage through a column packed with anhydrous calcium sulfate and then the hydrogen content was determined by thermal conductivity.

Hydrogen was evolved significantly at temperatures near 800°C, which was about two hours after beginning the heating.

EXAMPLE II

A corresponding experiment was performed using sodium hydroxide in an aluminum oxide crucible. The furnace was heated from room temperature. In this case hydrogen was evolved significantly after about one hour at a temperature near 280°C. After about two and one-half hours, and at about 500°C, more than 75 percent of the hydrogen expected, according to reaction (1), was evolved. After about six hours and at about 900°C, at which point the run was terminated, about 100 percent of the hydrogen expected was evolved. X-ray diffraction showed the solid product to be $NaFeO_2$.

EXAMPLE III

A corresponding experiment was performed using potassium hydroxide, also in an aluminum oxide crucible. In this case hydrogen was evolved significantly at 200°C. X-ray diffraction showed the solid product to be $K_2Fe_2O_4$. The results were otherwise undistinguishable from those of the experiment using sodium hydroxide.

EXAMPLE IV

The compounds, $NaFeO_2$ and $K_2Fe_2O_4$, produced in the experiments of Examples II and III were separately ground and exposed to warm water in a "Soxhlet" extractor, where the solids were continuously extracted with water, carrying away the soluble products of reaction and allowing newly formed solids to remain in the filter thimble.

A similar extraction was performed using acetone after the treatment with water in order to accelerate the drying of the solids and the filter thimble. Only traces of $Fe_3O_4$ were present in the dried product.

The solids were examined petrographically and by X-ray diffraction. The first method showed that only traces of $Fe_3O_4$ remained unreacted. The second method indicated the presence of $Fe(OH)_3$ with minor amounts of $Fe_2O_3 \cdot H_2O$ and $FeO(OH)$.

What is claimed is

1. A method for chemically generating hydrogen, comprising the steps of:
   reacting magnetic iron oxide with a molten alkali metal hydroxide to produce hydrogen, alkali metal ferrite and water;
   continuously exhausting the gaseous atmosphere from the reaction environment so as to continuously remove the hydrogen and water produced during said step of reacting;
   separating said hydrogen from said water; and
   collecting said separated hydrogen.

2. The method according to claim 1 wherein said alkali metal hydroxide is sodium hydroxide.

3. The method according to claim 2 wherein said step of reacting is carried out at a temperature within the range of 280°C to 600°C.

4. The method according to claim 1 wherein said alkali metal hydroxide is potassium hydroxide.

5. The method according to claim 4 wherein said step of reacting is carried out at a temperature within the range of 200°C to 500°C.

6. The method according to claim 1, further comprising:
   reacting said alkali metal ferrite with water to produce insoluble hydrated ferric oxide and said alkali metal hydroxide;
   separating the hydrated ferric oxide from the aqueous phase of said second mentioned step of reacting;
   subjecting the remaining aqueous phase to evaporation so as to recover said alkali metal hydroxide for reuse in said first mentioned step of reacting;
   heating said hydrated ferric oxide to decompose said hydrated ferric oxide into magnetic iron oxide and oxygen;
   recovering said oxygen; and
   reusing said magnetic iron oxide in said step of reacting.

* * * * *